(12) United States Patent
Kim et al.

(10) Patent No.: US 12,340,088 B2
(45) Date of Patent: Jun. 24, 2025

(54) MEMORY DEVICE, MEMORY CONTROL DEVICE AND OPERATING METHOD OF MEMORY DEVICE FOR CHECKING COMMAND AND ADDRESS (CA) SIGNAL WITH PREDETERMINED PATTERN OF COMMAND

(71) Applicant: SAMSUNG ELECTRONICS CO., LTD., Suwon-si (KR)

(72) Inventors: Hye-Ran Kim, Suwon-si (KR); Taeyoung Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/386,855

(22) Filed: Nov. 3, 2023

(65) Prior Publication Data
US 2024/0289018 A1    Aug. 29, 2024

(30) Foreign Application Priority Data

Feb. 28, 2023 (KR) .................. 10-2023-0026761
May 31, 2023 (KR) .................. 10-2023-0070033

(51) Int. Cl.
*G06F 3/06* (2006.01)
*G06F 11/10* (2006.01)

(52) U.S. Cl.
CPC .......... *G06F 3/0611* (2013.01); *G06F 3/0634* (2013.01); *G06F 3/0673* (2013.01); *G06F 11/1076* (2013.01)

(58) Field of Classification Search
CPC .... G06F 3/0611; G06F 3/0634; G06F 3/0673; G06F 11/1076
See application file for complete search history.

(56) References Cited

U.S. PATENT DOCUMENTS

| | | | |
|---|---|---|---|
| 7,089,404 B1 | 8/2006 | Rozas et al. | |
| 8,209,517 B1 | 6/2012 | Rozas et al. | |
| 8,423,834 B2 | 4/2013 | Sasazaki | |
| 9,009,570 B2 | 4/2015 | Troia | |
| 9,081,563 B2 | 7/2015 | Rozas et al. | |
| 9,557,926 B2 | 1/2017 | Troia | |
| 10,203,875 B1* | 2/2019 | Ying | G11C 29/028 |
| 10,892,003 B2 | 1/2021 | Jeddeloh | |
| 11,675,716 B2 | 6/2023 | Mozak et al. | |
| 2008/0209277 A1 | 8/2008 | Sasazaki | |
| 2012/0246453 A1 | 9/2012 | Rozas et al. | |

(Continued)

FOREIGN PATENT DOCUMENTS

| | | |
|---|---|---|
| EP | 2 859 451 B1 | 12/2019 |
| EP | 3 835 963 A1 | 6/2021 |

(Continued)

*Primary Examiner* — Ryan Bertram
(74) *Attorney, Agent, or Firm* — Sughrue Mion, PLLC

(57) ABSTRACT

A memory device includes: a plurality of command and address (CA) samplers configured to receive, as a plurality of first CA signals, a command comprising a predetermined pattern via a CA bus based on an exit of a sleep mode, wherein each of the plurality of CA samplers further is configured to sample a corresponding first CA signal among the plurality of first CA signals; and a command decoder configured to check a parity error in the plurality of first CA signals sampled by the plurality of CA samplers.

18 Claims, 11 Drawing Sheets

| | WCK CLOCK CYCLE | CA0 | CA1 | CA2 | CA3 | CA4 |
|---|---|---|---|---|---|---|
| RNOP1 | WCK0 | H | CABI | H | VALID COLUMN COMMAND | |
| | WCK1 | H | H | H | | |
| | WCK2 | V | V | V | | |
| | WCK3 | V | V | V | | |
| CNOP1 | WCK0 | | VALID ROW COMMAND | | H | H |
| | WCK1 | | | | H | H |
| | WCK2 | | | | V | V |
| | WCK3 | | | | V | CAPAR |

(56) References Cited

U.S. PATENT DOCUMENTS

| | | | |
|---|---|---|---|
| 2013/0332783 A1* | 12/2013 | Troia | G06F 3/0665 |
| | | | 714/E11.159 |
| 2014/0089755 A1 | 3/2014 | Kantamsetti et al. | |
| 2015/0160874 A1 | 6/2015 | Troia | |
| 2017/0358336 A1* | 12/2017 | Shido | G06F 13/16 |
| 2019/0034365 A1* | 1/2019 | Lovelace | G06F 13/1684 |
| 2019/0042519 A1* | 2/2019 | Jue | G06F 3/0659 |
| 2019/0237152 A1* | 8/2019 | Lee | G11C 29/36 |
| 2020/0110716 A1* | 4/2020 | Mozak | G06F 13/1694 |
| 2021/0013999 A1 | 1/2021 | Choudhary et al. | |
| 2022/0246183 A1* | 8/2022 | Bloemer | H03K 19/21 |
| 2023/0376414 A1* | 11/2023 | Kim | G06F 11/10 |

FOREIGN PATENT DOCUMENTS

| | | |
|---|---|---|
| EP | 3 920 442 A1 | 12/2021 |
| JP | 2008-217070 A | 9/2008 |
| KR | 10-2006-0002031 A | 1/2006 |

\* cited by examiner

FIG. 2

| | WCK CLOCK CYCLE | CA0 | CA1 | CA2 | CA3 | CA4 |
|---|---|---|---|---|---|---|
| RNOP1 | WCK0 | H | CABI | H | VALID COLUMN COMMAND | |
| | WCK1 | H | H | H | | |
| | WCK2 | V | V | V | | |
| | WCK3 | V | V | V | | |
| CNOP1 | WCK0 | VALID ROW COMMAND | | | H | H |
| | WCK1 | | | | H | H |
| | WCK2 | | | | V | V |
| | WCK3 | | | | V | CAPAR |

FIG. 3

| | RNOP2 | | | CNOP2 | |
|---|---|---|---|---|---|
| WCK CLOCK CYCLE | CA0 | CA1 | CA2 | CA3 | CA4 |
| WCK0 | H | H | H | H | H |
| WCK1 | H | H | H | H | H |
| WCK2 | H | H | H | H | H |
| WCK3 | H | H | H | H | H |

FIG. 5

|     | WCK0 | WCK1 | WCK2 | WCK3 |
|-----|------|------|------|------|
| CA0 | 0    | 0    | 1    | 0    |
| CA1 | 0    | 0    | 0    | 1    |
| CA2 | 0    | 0    | 1    | 0    |
| CA3 | 0    | 0    | 1    | 1    |
| CA4 | 0    | 0    | 1    | 0    |

FIG. 6

|     | WCK0 | WCK1 | WCK2 | WCK3 |
|-----|------|------|------|------|
| CA0 | 1    | 1    | 0    | 1    |
| CA1 | 1    | 1    | 1    | 0    |
| CA2 | 1    | 1    | 0    | 1    |
| CA3 | 1    | 1    | 0    | 0    |
| CA4 | 1    | 1    | 0    | 1    |

FIG. 9

|  | RNOP2/CNOP2 | | | | COMMAND WITH PATTERN | | | | RNOP2/CNOP2 | | | |
| --- | --- | --- | --- | --- | --- | --- | --- | --- | --- | --- | --- | --- |
|  | WCK-4 | WCK-3 | WCK-2 | WCK-1 | WCK0 | WCK1 | WCK2 | WCK3 | WCK4 | WCK5 | WCK6 | WCK7 |
| CA0 | 1 | 1 | 1 | 1 | 0 | 0 | 1 | 0 | 1 | 1 | 1 | 1 |
| CA1 | 1 | 1 | 1 | 1 | 0 | 0 | 0 | 1 | 1 | 1 | 1 | 1 |
| CA2 | 1 | 1 | 1 | 1 | 0 | 0 | 1 | 0 | 1 | 1 | 1 | 1 |
| CA3 | 1 | 1 | 1 | 1 | 0 | 0 | 1 | 1 | 1 | 1 | 1 | 1 |
| CA4 | 1 | 1 | 1 | 1 | 0 | 0 | 1 | 0 | 1 | 1 | 1 | 1 |

FIG. 11

|       |     | WCK0 | WCK1 | WCK2 | WCK3 |
|-------|-----|------|------|------|------|
| MODE1 | CA0 | 0    | 0    | 1    | 0    |
|       | CA1 | 0    | 0    | 0    | 1    |
|       | CA2 | 0    | 0    | 1    | 0    |
|       | CA3 | 0    | 0    | 1    | 1    |
|       | CA4 | 0    | 0    | 1    | 0    |
| MODE2 | CA0 | 0    | 0    | 1    | 1    |
|       | CA1 | 0    | 0    | 1    | 0    |
|       | CA2 | 0    | 0    | 1    | 1    |
|       | CA3 | 0    | 0    | 1    | 0    |
|       | CA4 | 0    | 0    | 1    | 1    |

MEMORY DEVICE, MEMORY CONTROL DEVICE AND OPERATING METHOD OF MEMORY DEVICE FOR CHECKING COMMAND AND ADDRESS (CA) SIGNAL WITH PREDETERMINED PATTERN OF COMMAND

CROSS-REFERENCE TO RELATED APPLICATION

This application is based on and claims priority under 35 U.S.C. § 119 to Korean Patent Application Nos. 10-2023-0026761, filed on Feb. 28, 2023, and 10-2023-0070033, filed on May 31, 2023, in the Korean Intellectual Property Office, the disclosure of which are incorporated herein by reference.

BACKGROUND

1. Field

The disclosure relates to a memory device, a memory control device, and an operating method of a memory device.

2. Description of the Related Art

A host may provide a command address (or command and address (CA)) signal to a memory device, and the memory device may perform a memory operation such as an activate operation, a read operation, or a write operation based on the CA signal. If a transmission error occurs on the CA bus, the memory device may not know which state to enter.

SUMMARY

Provided are a memory device, a memory control device, and an operating method of a memory device, for preventing a transmission error on a CA bus.

According to an aspect of the disclosure, a memory device includes: a plurality of command and address (CA) samplers configured to receive, as a plurality of first CA signals, a command comprising a predetermined pattern via a CA bus based on an exit of a sleep mode, wherein each of the plurality of CA samplers further is configured to sample a corresponding first CA signal among the plurality of first CA signals; and a command decoder configured to check a parity error in the plurality of first CA signals sampled by the plurality of CA samplers.

According to an aspect of the disclosure, a memory control device includes: a clock generating circuit configured to provide a clock to a memory device via a clock bus; and a command and address (CA) generating circuit configured to provide, as a plurality of first CA signals, a command comprising a predetermined pattern to the memory device via a CA bus, based on an exist of a sleep mode of the memory device.

According to an aspect of the disclosure, a method of operating a memory device, includes: exiting from a sleep mode of the memory device; receiving a first row-no-operation (RNOP) command and a first column-no-operation (CNOP) command via a command and address (CA) bus over a plurality of first clock cycles, wherein the RNOP command and the CNOP command comprise a predetermined type; receiving a command comprising a predetermined pattern via the CA bus over a plurality of second clock cycles after the plurality of first clock cycles; and receiving a second RNOP command and a second CNOP command comprising the predetermined type via the CA bus over a plurality of third clock cycles after the plurality of second clock cycles.

BRIEF DESCRIPTION OF DRAWINGS

The above and other aspects, features, and advantages of certain embodiments of the disclosure will be more apparent from the following description taken in conjunction with the accompanying drawings, in which:

FIG. 2 and FIG. 3 illustrate an example of a no operation command of a memory system according to some embodiments;

FIG. 5 and FIG. 6 illustrate an example of a command having a predetermined pattern according to some embodiments;

FIG. 9 illustrates an example of a command having a predetermined pattern according to some embodiments;

FIG. 11 illustrates an example of a command having a predetermined pattern according to some embodiments.

DETAILED DESCRIPTION

Figure 1:
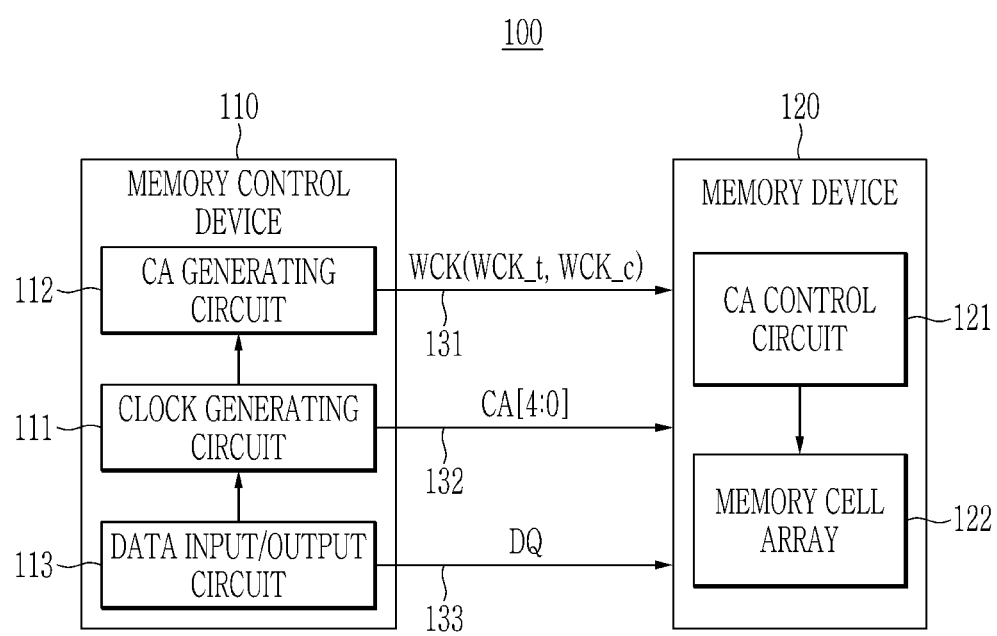
FIG. 1 illustrates an example of a memory system according to some embodiments.

The description merely illustrates the principles of the disclosure. Those skilled in the art will be able to devise one or more arrangements that, although not explicitly described herein, embody the principles of the disclosure. Furthermore, all examples recited herein are principally intended expressly to be only for explanatory purposes to help the reader in understanding the principles of the disclosure and the concepts contributed by the inventor to furthering the art and are to be construed as being without limitation to such specifically recited examples and conditions. Moreover, all statements herein reciting principles, aspects, and embodiments of the disclosure, as well as specific examples thereof, are intended to encompass equivalents thereof.

Accordingly, the drawings and description are to be regarded as illustrative in nature and not restrictive. Like reference numerals designate like elements throughout the specification. The sequence of operations or steps is not limited to the order presented in the claims or figures unless specifically indicated otherwise. The order of operations or steps may be changed, several operations or steps may be merged, a certain operation or step may be divided, and a specific operation or step may not be performed.

As used herein, the singular forms "a" and "an" are intended to include the plural forms as well, unless the context clearly indicates otherwise. Although the terms first, second, and the like may be used herein to describe various elements, components, steps and/or operations, these terms are only used to distinguish one element, component, step or operation from another element, component, step, or operation.

Terms used in the present disclosure are used only to describe a specific embodiment, and may not be intended to limit the scope of another embodiment. A singular expression may include a plural expression unless it is clearly meant differently in the context. The terms used herein, including a technical or scientific term, may have the same meaning as generally understood by a person having ordinary knowledge in the technical field described in the present disclosure. Terms defined in a general dictionary among the terms used in the present disclosure may be interpreted with the same or similar meaning as a contextual meaning of related technology, and unless clearly defined in the present disclosure, it is not interpreted in an ideal or excessively formal meaning. In some cases, even terms defined in the present disclosure cannot be interpreted to exclude embodiments of the present disclosure.

In one or more embodiments of the disclosure described below, a hardware approach is described as an example. However, since the one or more embodiments of the disclosure include technology that uses both hardware and software, the various embodiments of the present disclosure do not exclude a software-based approach.

In addition, in the disclosure, in order to determine whether a specific condition is satisfied or fulfilled, an expression of more than or less than may be used, but this is only a description for expressing an example, and does not exclude description of more than or equal to or less than or equal to. A condition described as 'more than or equal to' may be replaced with 'more than', a condition described as 'less than or equal to' may be replaced with 'less than', and a condition described as 'more than or equal to and less than' may be replaced with 'more than and less than or equal to'. In addition, hereinafter, 'A' to 'B' means at least one of elements from A (including A) and to B (including B).

The term "couple" and the derivatives thereof refer to any direct or indirect communication between two or more elements, whether or not those elements are in physical contact with each other. The terms "transmit", "receive", and "communicate" as well as the derivatives thereof encompass both direct and indirect communication. The terms "include" and "comprise", and the derivatives thereof refer to inclusion without limitation. The term "or" is an inclusive term meaning "and/or". The phrase "associated with," as well as derivatives thereof, refer to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" refers to any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of A, B, and C" includes any of the following combinations: A, B, C, A and B, A and C, B and C, and A and B and C, and any variations thereof. Similarly, the term "set" means one or more. Accordingly, the set of items may be a single item or a collection of two or more items.

FIG. 1 is a block diagram illustrating an example of a memory system according to some embodiments.

In FIG. 1, a memory system 100 may include a memory control device 110 and a memory device 120.

The memory control device 110 may provide various signals for operations of the memory device 120. The memory control device 110 may be a controller of a host. In some embodiments, the memory control device 110 may be a memory controller. In some embodiments, the memory control device 110 may be a processor with an embedded memory controller. The processor may include, by way of non-limiting examples, a central processing unit (CPU), a graphics processing unit (GPU), an accelerator, an application processor (AP), a neural processing unit (NPU), a vision processing unit (VPU), an image signal processor (ISP), or a digital signal processor (DSP). In some embodiments, the memory control device may be provided as a system on chip (SoC).

The memory device 120 may include, by way of non-limiting examples, a dynamic random-access memory (DRAM), a synchronous DRAM (SDRAM), a synchronous graphics random-access memory (SGRAM), a static random-access memory (SRAM), a phase-change random-access memory (PRAM), a magnetoresistive random-access memory (MRAM), a resistive random-access memory (RRAM), or a ferroelectric random-access memory (FRAM).

The memory device 120 may be connected to the memory control device 110 via a bus. In some embodiments, the bus may include a signal transmission path, a link, or a channel for transmitting signals. In some embodiment, the bus may include a clock bus 131, a command and address (CA) bus 132, and a data bus 133. In some embodiments, the clock bus 131 and the CA bus 132 may be unidirectional buses for transmitting signals from the memory control device 110 to the memory device 120, and the data bus 133 may be a bidirectional bus for transmitting signals from the memory control device 110 to the memory device 120 and from the memory device 120 to the memory control device 110.

The memory device 120 may receive a clock WCK from the memory control device 110 via the clock bus 131. In some embodiments, the clock WCK may include a pair of clocks WCK_t and WCK_c. The pair of clocks may include, by way of non-limiting examples, a pair of differential clocks WCK_t and WCK_c.

The memory device 120 may receive a CA signal from the memory control device 110 via the CA bus 132. In some embodiments, the memory control device 110 may register the CA signal at a rising edge of the clock WCK. In one embodiment, the rising edge of clock WCK may be defined as the crossing of a positive edge of the clock WCK_t and a negative edge of clock WCK_c. In some embodiments, the memory device 120 may generate an internal clock based on the clock WCK, and may receive the CA signal from the memory control device 110 via the CA bus 132 based on the internal clock. The CA signal may include a plurality of bits, by way of non-limiting examples, five bits CA[4:0]. The CA signal with the five bits may be represented by five CA signals CA0, CA1, CA2, CA3, and CA4 each having one bit. In some embodiments, a command and an address may be packetized on the CA signal CA[4:0] over one or more unit clock cycles. The unit clock cycle may include a plurality of clock cycles WCK (e.g., four clock cycles WCK).

The memory device 120 may receive data DQ from the memory control device 110 via the data bus 133, or may transmit data DQ to the memory control device 110. An operation in which the memory device 120 receives the data DQ from the memory control device 110 may be referred to as a write operation or an input operation, and an operation in which the memory device 120 transmits the data DQ to the memory control device 110 may be referred to as a read operation or an output operation.

In some embodiments, the memory control device 110 may include a clock generating circuit 111, a CA generating circuit 112, and a data input/output circuit 113.

The clock generating circuit 111 may generate the clock WCK, and may transmit the clock WCK to the memory device 120 via the clock bus 131. The clock generating circuit 111 may provide the clock WCK to the CA generating circuit 112 and the data input/output circuit 113. In some embodiments, the clock generating circuit 111 may include at least one of various clock generators including, by way of non-limiting examples, a ring oscillator, a delay locked loop circuit, and a phase locked loop circuit, to generate the clock WCK. In some embodiments, the clock generating circuit 111 may regulate a frequency and/or phase of the clock WCK, and may provide the frequency- and/or phase-regulated clock WCK to the CA generating circuit 112 and/or the data input/output circuit 113.

The data input/output circuit 113 may transmit the data DQ to the memory device 120 or receive the data DQ from the memory device 120 via the data bus 133 based on the clock WCK.

The CA generating circuit 112 may generate a set of CA signals based on a request. The set of CA signals may include CA signals CA[4:0] over a unit clock cycle. Thus, the CA generating circuit 112 may transmit the set of CA signals to the memory device 120 during the unit clock cycle. That is, the CA generating circuit 112 may transmit the set of CA signals by providing the CA signals to the memory device 120 at each clock cycle WCK (e.g., in synchronization with the clock WCK) during the unit clock cycle. Each CA signal CA[4:0] in the set of CA signals may include a row command/address and a column command/address. In this case, some bits of the CA signal may carry the row command/address and some bits of the CA signal may carry the column command/address. In one embodiment, three bits CA[2:0] of the CA signal CA[4:0] may carry the row command/address, and two bits CA[4:3] of the CA signal may carry the column command/address. By way of non-limiting examples, the three bits CA[2:0] of the CA signal may be transmitted for four clock cycles WCK, resulting in 12 bits of the CA signals carrying the row command/address, and the two bits CA[4:3] of the CA signal may be transmitted for four clock cycles WCK, resulting in eight bits of the CA signals carrying the column command/address. The memory device 120 may generate a row command and a row address based on the row command/address, and may generate a column command and a column address based on the column command/address. Throughout the disclosure, WCK may indicate a clock or a clock cycle.

In some embodiments, the memory device 120 may include a CA control circuit 121 and a memory cell array 122. The CA control circuit 121 may generate an internal clock based on the clock WCK, and may sample and decode the CA signal in synchronization with the internal clock to generate the command and the address. The CA control circuit 121 may provide the command and address to the memory cell array 122. The memory cell array 122 may include a plurality of memory cells defined by a plurality of rows and a plurality of columns. The memory cell array 122 may operate in response to the command and/or the command and address provided by the CA control circuit 121. The memory device 120 may further include peripheral circuits to control the operation of the memory cell array 122.

Since the command/address is transmitted via the CA bus, the memory device 120 may not know which state to enter when a transmission error occurs on the CA bus. In particular, after a long period of time has elapsed from a time when the memory device 120 enters a sleep mode because there is no access to the memory device 120, the clock WCK may be enabled and the CA bus may be operated to exit the memory device 120 from the sleep mode. In this case, a temperature of the memory device 120 may drop (or be lower than a threshold value) due to the long period of the sleep mode, causing a delay in a CA signal path and a delay in a clock path to vary. The delay in the CA signal path may be not equal to the delay in the clock path. In particular, in a case where the delay in the clock path is compensated by a host (e.g., a memory control device 110), a clock path delay circuit may be located in the memory device 120 and a CA signal path delay circuit may be located in the host, so that the delays may be further different because temperature-dependent changes in characteristics of the transistors differ between the memory device 120 and the host. To address this, the memory device 120 may perform a 'CA training' each time it exits from the sleep mode, but the CA training may increase the latency to access the memory device 120 after exiting from the sleep mode. The CA training is a feature of a memory device (e.g., the memory device 120) used for optimizing the setup and hold times of a CA bus (e.g., the CA bus 132) relative to the memory clock (e.g., WCK). The CA training is a special mode of operation in the memory enabled, e.g., through mode register writes. Therefore, in some embodiments, after exiting from the sleep mode, the memory device may check whether the CA bus operates normally, and may perform the CA training if the CA bus does not operate normally.

FIGS. 2 and 3 are each a drawing illustrating an example of a no operation (NOP) command of a memory system according to some embodiments.

A memory control device (e.g., 110 in FIG. 1) may provide a NOP command to a memory device (e.g., 120 in FIG. 1) as CA signals over a unit clock cycle, which instructs the memory device 120 to perform no operation. That is, a set of CA signals (provided over the unit clock cycle) may include the NOP command. In some embodiments, the NOP command may include a row-no-operation (RNOP) command that performs no operation for a row command and a column-no-operation (CNOP) command that performs no operating for a column command. By way of non-limiting examples, in the set of CA signals, three bits CA[2:0] of each CA signal may carry the RNOP command, and two bits CA[4:3] of each CA signal may carry the CNOP command.

In some embodiments, as shown in FIG. 2, in the RNOP command, at a first clock cycle WCK0 of the unit clock cycle, the first bit CA0 of the CA signal may have a high level (e.g., '1' as logical level) (shown as H in FIG. 2), the second bit CA1 of the CA signal may be set to an inversion information (e.g., command address bus inversion, CABI) field, and the third bit CA2 of the CA signal may have a high level. At the second clock cycle WCK1 of the unit clock cycle, the three bits, CA0, CA1, and CA2 of the CA signal, may have the high level, and at a third clock cycle WCK2 and a fourth clock cycle WCK3 of the unit clock cycle, the three bits, CA0, CA1, and CA2 of the CA signal, may be set to valid fields (shown as V in FIG. 2). The RNOP command shown in FIG. 2 may be referred to as an "RNOP1 command." The CABI field may be a field for inverting the set of CA signals. When the CABI field is set to a predetermined value (e.g., low level, for example, '0' as logical level)), the memory device 120 may invert and decode the set of CA signals (i.e., CA signals over the unit clock cycle). If the CABI field is set to a value different from the predetermined value (e.g., high level, for example, '1' as logical level)), the memory device 120 may decode the set of CA signals (i.e., CA signals over the unit clock cycle) without inverting. The valid field V may be a field whose bit may have either high level or low level.

In the CNOP command, at the first and second clock cycles WCK0 and WCK1 of the unit clock cycle, the fourth and fifth bits CA3 and CA4 of the CA signal may have the high level, and at the third clock cycle WCK2, two bits CA3 and CA4 of the CA signal may be set to the valid fields V. At the fourth clock cycle WCK3, the fourth bit CA3 of the CA signal may be set to the valid field V, and the fifth bit CA4 of the CA signal may be set to a parity field CAPAR. The CNOP command (shown in FIG. 2) may be referred to as a "CNOP1 command." The set of CA signals may be set to have even parity during the unit clock cycle, i.e., the four clock cycles WCK0, WCK1, WCK2, and WCK3. That is, a value of the CAPAR field may be set such that a sum of all bits in the set of CA signals (or the total number of bits having '1') during the unit clock cycle is even. Thus, the CAPAR field may not affect an operation of the memory device 120, and may be used to check whether an error occurs on the CA bus due to an input/output (I/O) failure.

The fourth and fifth bits CA3 and CA4 of the CA signal in the RNOP command may be set to a valid column command field to which a column command/address may be assigned, and the first to third bits CA0, CA1, and CA2 of the CA signal in the CNOP command may be set to a valid row command field to which a row command/address may be assigned.

In some embodiments, all three bits CA0, CA1, and CA2 at the third and fourth clock cycles WCK2 and WCK3 in the RNOP command may also be set to the high level, as shown in FIG. 3. The RNOP command shown in FIG. 3 may be referred to as an "RNOP2 command." That is, the RNOP command in which all three bits CA0, CA1, and CA2 over the unit clock cycle WCK0, WCK0, WCK2, and WCK3 are set to the high level may be referred to as the RNOP2 command. In one embodiment, the two bits CA3 and CA4 at the third and fourth clock cycles WCK2 and WCK3 in the CNOP command may also be set to the high level. The CNOP command shown in FIG. 3 may be referred to as a "CNOP2 command." That is, the CNOP command in which the two bits CA3 and CA4 over the unit clock cycle WCK0, WCK0, WCK2, and WCK3 are set to the high level may be referred to as the CNOP2 command. In some embodiments, during certain state transitions of the memory device, a host may provide the memory device with the RNOP2 command and the CNOP2 command as CA signals. The certain state transitions may include sleep mode exit.

Figure 4:
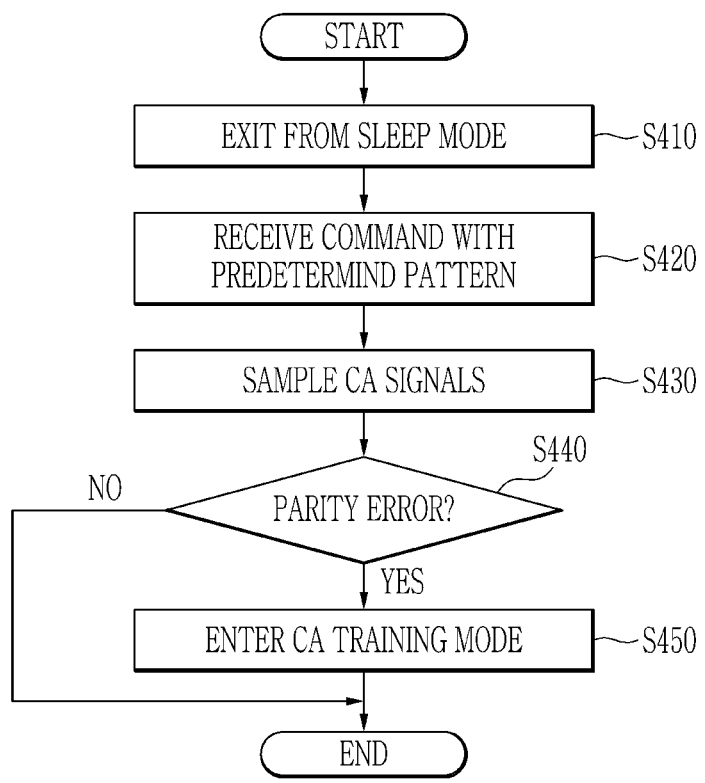
FIG. 4 illustrates an example of an operating method of a memory device according to some embodiments.

FIG. 4 is a flowchart illustrating an example of an operation method of a memory device according to some embodiments, and FIGS. 5 and 6 are each a drawing illustrating an example of a command having a predetermined pattern according to some embodiments.

In FIG. 4, in response to (or based on) sleep mode exit of a memory device (e.g., when the memory device exits from a sleep mode) in S410, a host may transmit, as a CA signal, a command having a predetermined pattern over a plurality of clock cycles (e.g., one or more unit clock cycles) to the memory device in S420. The memory device may receive the CA signal from the host and may sample the received CA signal in S420. In some embodiments, the host may be a memory control device (e.g., 110 in FIG. 1). In one embodiment, the predetermined pattern may be a CA bus test pattern that may cause inter-symbol interference (ISI) on a CA bus. In some embodiments, based on the predetermined pattern, one or more bits of the CA signal (i.e., one or more CA signals among a plurality of CA signals) are toggled from '1' to '0' or from '0' to '1'. In some embodiments, based on the predetermined pattern, one or more bits of the CA signal change to '1' after having '0' over a plurality of consecutive clock cycles, or change to '0' after having '1' over the plurality of consecutive clock cycles. In some embodiments, if the one or more bits change to '1' after having '0' over the plurality of consecutive clock cycles, they may change back to '0' after having '1' at a single clock cycle. Similarly, if the one or more bits change to '0' after having '1' over the plurality of consecutive clock cycles, they may change back to '1' after having '0' at a single clock cycle.

In some embodiments, the command having the predetermined pattern may be an RNOP1 command and a CNOP1 command (hereinafter referred to as an "RNOP1/CNOP1" command) with the predetermined pattern. In the RNOP1/CNOP1 command, a valid column command field of the RNOP1 command may be set to the CNOP1 command. In this case, the predetermined pattern may be set in valid fields of the RNOP1/CNOP1 command. In some embodiments, the predetermined pattern may be set such that one or more bits (or first bits) of the valid fields (i.e., the one or more bits at the third and fourth clock cycles of the unit clock cycle) in the RNOP1/CNOP1 command have different values from bit values at the first and second clock cycles of the unit clock cycle. If a CABI field of the RNOP1/CNOP1 command is set to a value (e.g., '0') indicating inversion, the one or more bits of the RNOP1/CNOP1 command may be set to '1'. Alternatively, if the CABI field of the RNOP1/CNOP1 command is set to a value (e.g., '1') that does not indicate inversion, the one or more bits of the RNOP1/CNOP1 command may be set to '0'. Toggling to '1' after two or more consecutive '0's or toggling to '0' after two or more consecutive '1's may cause the ISI for a short period of time. In this case, toggling back to '0' after the two or more consecutive '0's followed by toggling to '1' or toggling back to '1' after the two or more consecutive '1's followed by toggling to '0' may cause the more ISI.

The predetermined pattern of the RNOP1/CNOP1 command may be set, by way of non-limiting examples, as shown in FIG. 5. In FIG. 5, in a case where the CABI field of the RNOP1/CNOP1 command is set to the value (e.g., '0') indicating inversion, the predetermined pattern may be set such that (or based on the predetermined pattern) at the third and fourth clock cycles WCK2 and WCK3 of the unit clock cycle, the first bits CA0[3:2] of the CA signals are respectively set to '1' and '0', the second bits CA1[3:2] of the CA signals are respectively set to '0' and '1', the third bits CA2[3:2] of the CA signals are respectively set to '1' and '0', the fourth bits CA3[3:2] of the CA signals are set to '1', and the fifth bits CA4[3:2] of the CA signals are respectively set to '1' and '0'. In this case, all bits (CA0[1:0] to CA4[1:0]) of the RNOP/CNOP command may be set to '0' at the first and second clock cycles WCK0 and WCK1 of the unit clock cycle. Since the CABI field is set to '0', the memory device may decode the CA signals by inverting results of sampling the CA signals received over the unit clock cycle. The memory device may then recognize the CA signals as the RNOP1/CNOP1 command because it recognizes all the bits sampled at timings of the first and second clock cycle WCK0 and WCK1 of the unit clock cycle as '1'.

The predetermined pattern of the RNOP1/CNOP1 command may be set, by way of non-limiting examples, as shown in FIG. 6. In FIG. 6, in a case where the CABI field of the RNOP1/CNOP1 command is set to the value (e.g., '1') that does not indicate inversion, the predetermined pattern may be set such that (or based on the predetermined pattern) the first bits CA0[3:2] of the CA signals are respectively set to '0' and '1', the second bits CA1[3:2] of the CA signals are respectively set to '1' and '0', the third bits CA2[3:2] of the CA signals are respectively set to '0' and '1', the fourth bits CA3[3:2] of the CA signals are set to '0', and the fifth bits CA4[3:2] of the CA signals are respectively set to '0' and '1'. In this case, all bits CA0[1:0] to CA4[1:0] of the RNOP/CNOP command may be set to '1' at the first and second clock cycles WCK0 and WCK1 of the unit clock cycle. Since the CABI field is set to '1', the memory device may decode the CA signals without inverting the results of sampling the CA signals received over the unit clock cycle. The memory device may then recognize the CA signals as the RNOP1/CNOP1 command because it recognizes all the bits sampled at timings of the first and second clock cycle WCK0 and WCK1 of the unit clock cycle as '1'.

In FIG. 4 again, the memory device may sample and decode the CA signals received over one or more unit clock cycles in S430. In some embodiments, when the CABI field of the sampled CA signals has a predetermined value (e.g., '0'), the memory device may decode the CA signals by inverting sampling values of the CA signals. When the CABI field does not have the predetermined value, the memory device may decode the CA signals without inverting the sampling values of the CA signals.

The memory device may determine whether a parity (CAPAR) error occurs in the CA signals to check a timing margin (or operating margin) of the CA bus in S440. In some embodiments, the memory device may determine that the parity error has occurred if the CA signals decoded over the unit clock cycle do not satisfy even parity in S440. If the CA bus does not operate normally, in an example shown in FIG. 5, the ISI may cause '1' to be sampled to '0' or '0' to be sampled to '1' in any bit of the CA signals CA0[3:2], CA2[3:2], and CA4[3:2] transmitted at the third and fourth clock cycles WCK2 and WCK3, resulting in a parity error. In some embodiments, the memory device may use an error signal ERR to indicate to the host whether the parity error has occurred. If the parity error has occurred, the memory device may enter a CA training mode and perform CA training in S450. The CA training mode may be used to improve the timing margin on the CA bus. Although various CA training modes may be used, the disclosure is not limited to the CA training mode. If the parity error has not occurred, the memory device may receive a subsequent command from the host.

According to the above-described embodiments, the memory device may not enter the CA training mode directly, but may test the timing margin of the CA bus based on the command having the predetermined pattern and then enter the CA training mode if the test fails. In one embodiment, this may improve the performance of the memory device by reducing the latency to access the memory device after the sleep mode exit.

Figure 7:
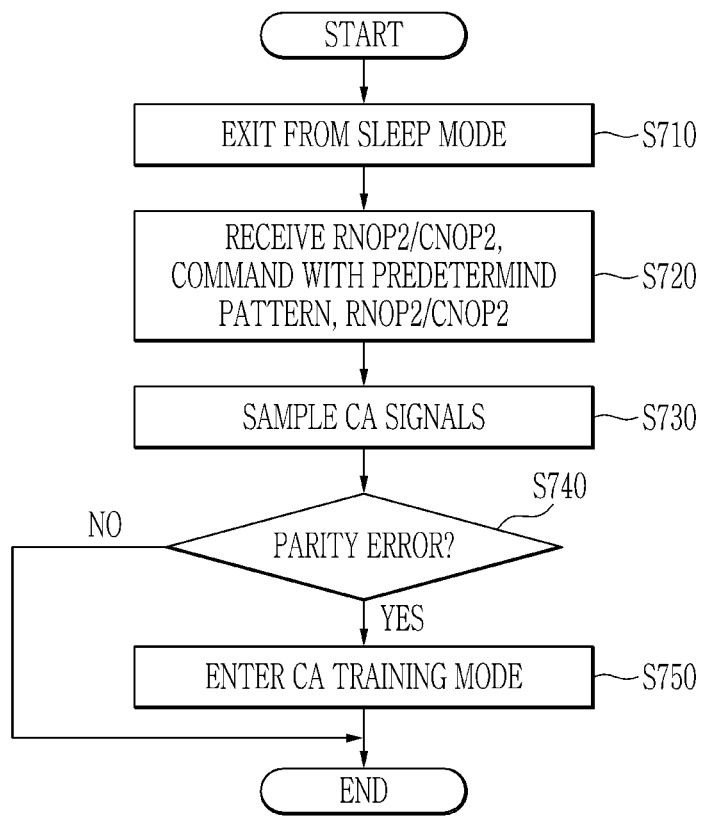
FIG. 7 illustrates an example of an operating method of a memory device according to some embodiments.
Figure 8:
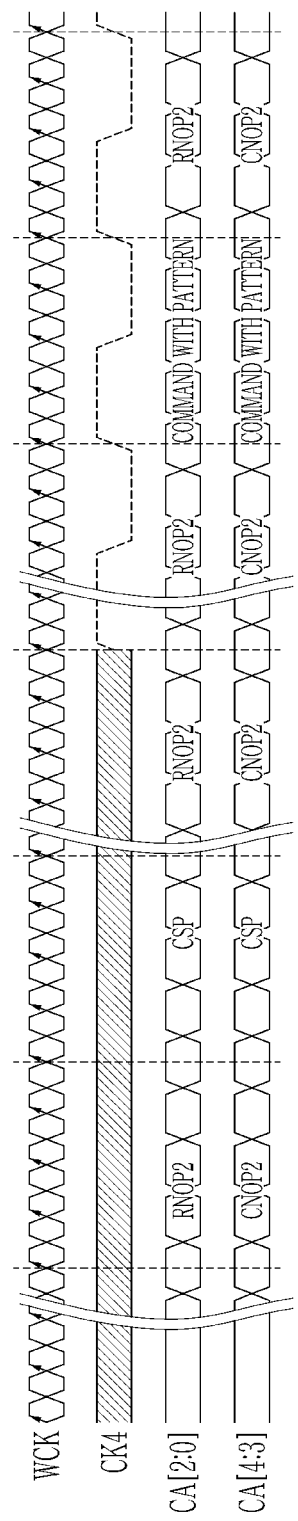
FIG. 8 illustrates an example of an operating method of a memory device according to some embodiments.

FIG. 7 is a flowchart illustrating an example of an operation method of a memory device according to some embodiments, FIG. 8 is a timing diagram illustrating an example of an operation method of a memory device according to some embodiments, and FIG. 9 is a diagram illustrating an example of a command having a predetermined pattern according to some embodiments.

In FIG. 7, in response to (or based on) an exit of sleep mode of a memory device (e.g., when the memory device exits from a sleep mode) in S710, a host may transmit, as a CA signal, a command having a predetermined pattern over a plurality of clock cycles (e.g., one or more unit clock cycles CK4) to the memory device in S720. The memory device may receive the CA signal from the host and sample the received CA signal in S720. In some embodiments, the host may be a memory control device (e.g., 110 of FIG. 1). In some embodiments, the host may transmit to the memory device, after transmitting an RNOP2 command and a CNOP2 command (hereinafter referred to as an "RNOP2/CNOP2 command") over a unit clock cycle CK4, the command having the predetermined pattern over one or more unit clock cycles CK4, and then may transmit the RNOP2/CNOP2 command over the other unit clock cycle CK4 in S720. In one embodiment, the predetermined pattern may be a CA bus test pattern that may cause an ISI on a CA bus. In some embodiments, based on the predetermined pattern, one or more bits of the CA signal are toggled from '1' to '0' or from '0' to '1'. In some embodiments, based on the predetermined pattern, one or more bits of the CA signal change to '1' after having '0' over a plurality of consecutive clock cycles, or change to '0' after having '1' over the plurality of consecutive clock cycles. In some embodiments, if the one or more bits change to '1' after having '0' over the plurality of consecutive clock cycles, they may change back to '0' after having '1' at a single clock cycle. Similarly, if the one or more bits change to '0' after having '1' over the plurality of consecutive clock cycles, they may change back to '1' after having '0' at a single clock cycle. In some embodiments, based on the predetermined pattern, one or more bits have '0' at a beginning clock cycle among the plurality of clock cycles, or have '0' at the last clock cycle among the plurality of clock cycles.

In some embodiments, the command having the predetermined pattern may be an RNOP1/CNOP1 command having the predetermined pattern. In this case, a set of the RNOP2/CNOP2 command, the command having the predetermined pattern, and the RNOP2/CNOP2 command provided to the memory device may have a pattern shown in FIG. 9. Accordingly, as shown in FIG. 9, the memory device may receive the RNOP2/CNOP2 command over a first unit clock cycle (WCK-4, WCK-3, WCK-2, and WCK-1), may receive the RNOP1/CNOP1 command with the predetermined pattern over a next unit clock cycle (WCK0, WCK1, WCK2, and WCK3), and then may receive the RNOP2/CNOP2 command over a next unit clock cycle (WCK4, WCK5, WCK6, and WCK7), in S720.

In some embodiments, after transmitting the RNOP2/CNOP2 command to the memory device, the host may provide a command start point (CSP) command to the memory device, and then may transmit the RNOP2/CNOP2 command to the memory device again. The CSP command may be a command for aligning an internal clock of the memory device with a command burst boundary, and may inform the memory device of a start clock of the command. In some embodiments, as shown in FIG. 8, the host may transmit a set of the RNOP2/CNOP2 command, the CSP command, and the RNOP2/CNOP commands before transmitting the set of the RNOP2/CNOP2 command, the command having the predetermined pattern, and the RNOP2/CNOP2 command. In some other embodiments, the host may transmit the set of the RNOP2/CNOP2 command, the CSP command, and the RNOP2/CNOP commands after transmitting the set of the RNOP2/CNOP2 command, the command having the predetermined pattern, and the RNOP2/CNOP2 command.

In FIG. 7 again, the memory device may sample the received CA signals at each unit clock cycle CK4 and decode the sampled CA signals in S730. In some embodiments, if a CABI field of the sampled CA signals has a predetermined value (e.g., '0'), the memory device may decode the CA signals by inverting sampling values of the CA signals. If the CABI field does not have the predetermined value, the memory device may decode the CA signals without inverting the sampling values of the CA signals.

The memory device may determine if a parity (CAPAR) error occurs in the CA signals to check a timing margin (or operating margin) of the CA bus in S740. In some embodiments, in S740, the memory device may determine that the parity error has occurred if the CA signals decoded over the unit clock cycle CK4 does not satisfy even parity. If one or more bits of the CA signals maintain '1' in the RNOP2/CNOP2 command and then switch to '0' in the command having the predetermined pattern as shown in FIG. 9, '0' may be sampled as '1' due to ISI or a timing deviation between the clock WCK and the CA signal. Alternatively, if one or more bits of the CA signals have '1' in the command having the predetermined pattern and then switch to '0' in the RNOP2/CNOP2 command as shown in FIG. 9, '1' may be sampled as '0' due to the ISI or the timing deviation between the clock WCK and the CA signal. Alternatively, the ISI may cause '1' to be sampled as '0' or '0' to be sampled as '1' in any bit of the CA signals CA0[3:2], CA2[3:2], and CA4[3:2] transmitted on the third and fourth clock cycles WCK2 and WCK3. In such cases, the parity error may occur. In some embodiments, the memory device may use an error signal ERR to indicate to the host whether the parity error has occurred. If the parity error has occurred, the memory device may enter a CA training mode and perform CA training in S750. If the parity error has not occurred, the memory device may receive a subsequent command from the host.

According to the above-described embodiments, the memory device may not enter the CA training mode directly, but may test the timing margin of the CA bus based on the command having the predetermined pattern and then enter the CA training mode if the test fails. In one embodiment, this may improve the performance of the memory device by reducing the latency to access the memory device after the sleep mode exit.

Figure 10:
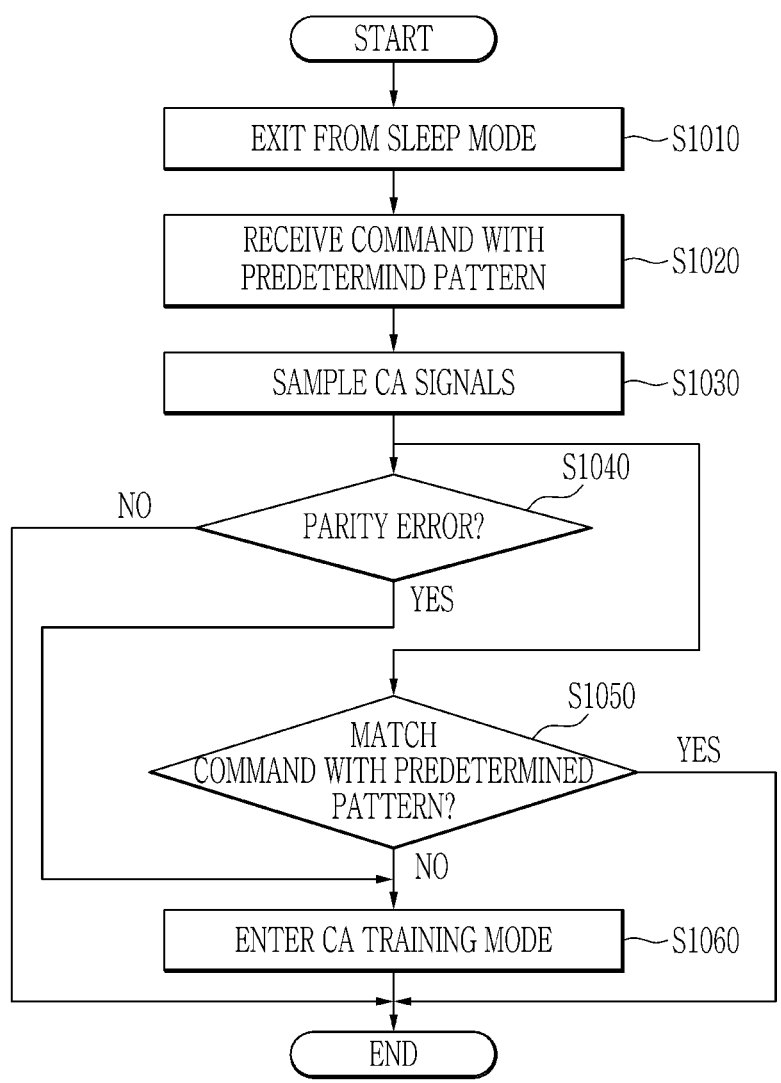
FIG. 10 illustrates an example of an operating method of a memory device according to some embodiments.

FIG. 10 is a flowchart illustrating an example of an operating method of a memory device according to some embodiments, and FIG. 11 is a diagram illustrating an example of a command having a predetermined pattern according to some embodiments.

In FIG. 10, in response to sleep mode exit of a memory device (e.g., when the memory device exits from a sleep mode) in S1010, a host may transmit, as a CA signal, a command having a predetermined pattern over a plurality of clock cycles (e.g., one or more unit clock cycles) to the memory device in S1020. The memory device may receive the CA signal from the host in S1020 and sample the received CA signal in S1030. In some embodiments, the host may be a memory control device (e.g., 110 in FIG. 1). The predetermined pattern may be a pattern predefined between the host and the memory device. In some embodiments, an RNOP/CNOP command may be used as the command having the predetermined pattern between the host and the memory device. Hereinafter, such an RNOP/CNOP command is referred to as an "RNOP3/CNOP3 command."

In one embodiment, the predetermined pattern may be a CA bus test pattern that may cause an ISI on a CA bus. In some embodiments, based on the predetermined pattern, one or more bits of the CA signal toggle from '1' to '0' or from '0' to '1' over a plurality of clock cycles WCK. In one embodiment, an RNOP/CNOP command having the pattern shown in FIG. 5 may be used as the RNOP3/CNOP3 command. In some embodiments, a plurality of RNOP3/CNOP3 commands may be predefined between the host and the memory device. The plurality of RNOP3/CNOP3 commands may correspond to a plurality of modes, respectively. In one embodiment, as shown in FIG. 11, an RNOP3/CNOP3 command in mode 1 and an RNOP3/CNOP3 command in mode 2 may be predefined. In FIG. 11, the RNOP3/CNOP3 command in mode 1 may be defined as in the command shown in FIG. 5, and the RNOP3/CNOP3 command in mode 2 may be defined in a different pattern in the third and fourth clock cycles WCK2 and WCK3.

The memory device may sample and decode the received CA signals over the unit clock cycle in S1030. In some embodiments, if a CABI field of the sampled CA signals has a predetermined value (e.g., '0'), the memory device may decode the CA signals by inverting sampling values of the CA signals. If the CABI field does not have the predetermined value, the memory device may decode the CA signals without inverting the sampling values of the CA signals.

The memory device may determine if a parity (CAPAR) error occurs in the CA signals in S1040. In some embodiments, the memory device may determine that the parity error has occurs if the CA signals decoded over the unit clock cycle does not satisfy even parity in S1040. The memory device may also determine if the decoded CA signals are identical to the command having the predetermined pattern in S1050. In some embodiments, in S1050, the memory device may determine that the decoded CA signals are identical to the RNOP3/CNOP3 command in the currently set mode. In some embodiments, the memory device may use an error signal ERR to inform the host whether the parity error has occurred or whether the decoded CA signals are identical to the RNOP3/CNOP3 command. In some embodiments, the memory device may generate a first error signal indicating whether the parity error has occurred, may generate a second error signal indicating whether the decoded CA signals are identical to the RNOP3/CNOP3 command, and combine the first error signal and the second error signal (e.g., by performing an OR operation on the first error signal and the second error signal) to generate the error signal ERR. If the parity error has occurred in S1040, or if the decoded CA signals are not identical to the RNOP3/CNOP3 command, the memory device may enter a CA training mode and perform CA training in S1060. If the parity error has not occurred and the decoded CA signals are identical to the RNOP3/CNOP3 command, the memory device may receive a subsequent command from the host.

There may be cases where a sampling error occurs in the CA signals even if no parity error occurs. In one embodiment, if the sampling error occurs in two bits of the CA signals, the parity error may not occur because even parity is satisfied. According to the above-described embodiments, even though the sampling error does not cause the parity error, the second error signal may be generated indicating that the decoded CA signals are not identical to the RNOP3/CNOP3 command because the CA signals with the sampling error are not identical to the RNOP3/CNOP3 command.

Figure 12:
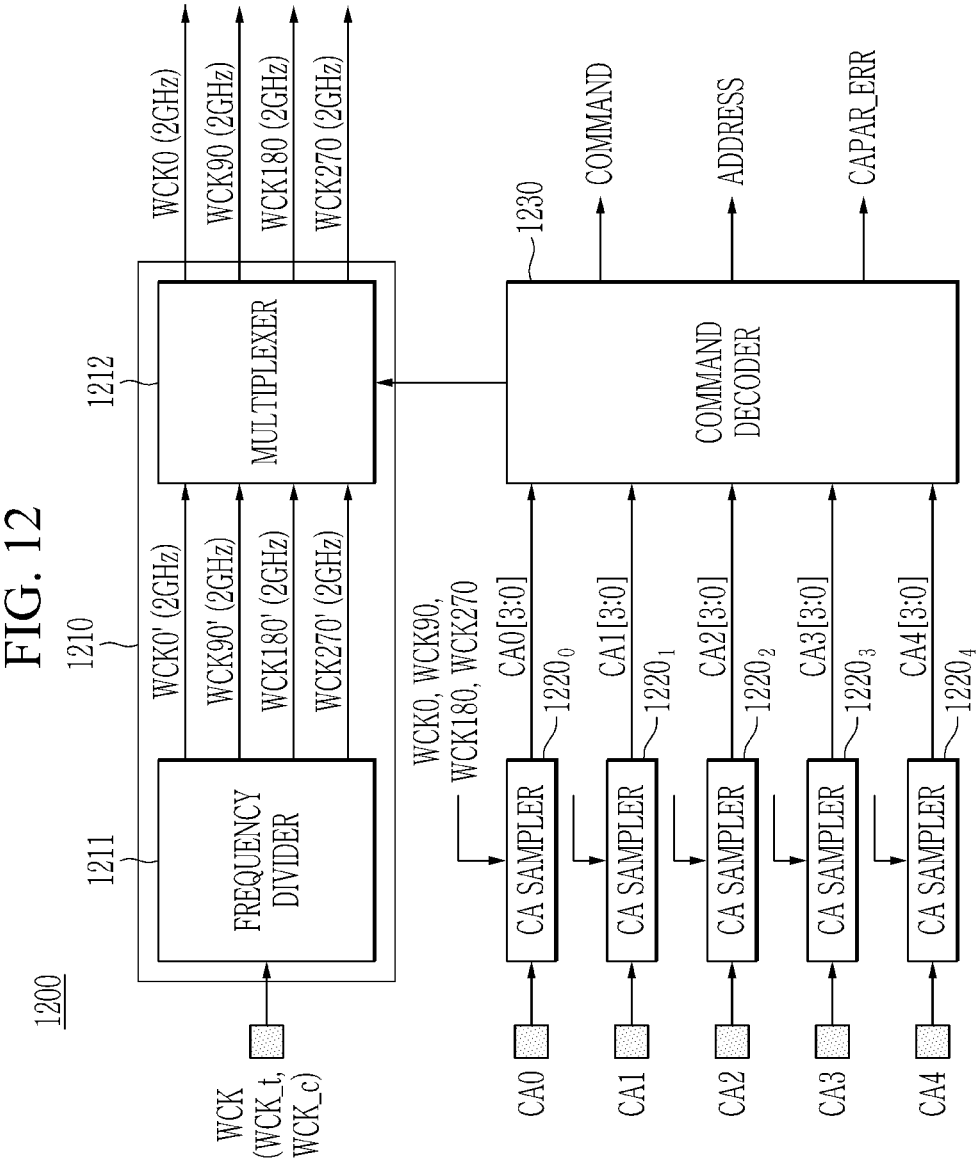
FIG. 12 and FIG. 13 illustrate an example of a CA control circuit according to some embodiments.

FIG. 12 is a block diagram illustrating an example of a CA control circuit according to some embodiments.

In FIG. 12, a CA control circuit 1200 may include a frequency dividing circuit 1210, a plurality of CA samplers $1220_0$, $1220_1$, $1220_2$, $1220_3$, and $1220_4$, and a command decoder 1230.

The frequency dividing circuit 1210 may receive a clock WCK from a host (e.g., memory control device 110 in FIG. 1). In some embodiments, the clock WCK may include a pair of differential clocks WCK_t and WCK_c. The frequency dividing circuit 1210 may divide a frequency of the clock WCK by one-quarter to generate four clocks WCK0, WCK90, WCK180, and WCK270 having different phases. In one embodiment, if the clock WCK has a frequency of 8 GHZ, frequency dividing circuit 1210 may generate the clocks WCK0, WCK90, WCK180, and WCK270 with a frequency of 2 GHz. In this case, the clock WCK90 may be phase-shifted by 90° from the clock WCK0, the clock WCK180 may be phase-shifted by 90° from the clock WCK90, and the clock WCK270 may be phase-shifted by 90° from the clock WCK180.

The plurality of CA samplers $1220_0$, $1220_1$, $1220_2$, $1220_3$, and $1220_4$ may correspond to a plurality of CA signals CA0, CA1, CA2, CA3, and CA4, respectively. Each CA sampler $1220_i$ may sample a corresponding CA signal in synchronization with the clocks WCK0, WCK90, WCK180, and WCK270. In one embodiment, each CA sampler $1220_i$ may sample four bits CAi[3:0] of a CA signal by sampling the CA signal CAi transmitted at the first clock of a unit clock cycle in synchronization with the clock WCK0, sampling the CA signal CAi transmitted at the second clock of the unit clock cycle in synchronization with the clock WCK90, sampling the CA signal CAi transmitted at the third clock of the unit clock cycle in synchronization with the clock WCK180, and sampling the CA signal CAi transmitted at the fourth clock of the unit clock cycle in synchronization with the clock WCK270

The command decoder 1230 may decode the CA signals CA1[3:0] to CA5[3:0] sampled over unit clock cycle to generate a command and an address. The command decoder 1230 may decode an activate command, a precharge command, a read command, or a write command based on a value of the CA signals CA1[3:0] to CA5[3:0]. If a CABI field of the CA signals has a predetermined value (e.g., '0'), the command decoder 1230 may decode the CA signals CA1[3:0] to CA5[3:0] by inverting the sampled CA signals CA1[3:0] to CA5[3:0]. Further, the command decoder 1230 may check a parity error in the CA signals CA1[3:0] to CA5[3:0], and may output an error signal CAPAR_ERR indicating whether the parity error has occurred in the CA signals CA1[3:0] to CA5[3:0].

In some embodiments, the frequency dividing circuit 1210 may include a frequency divider 1211 and a multiplexer 1212. The frequency divider 1211 may divide a frequency of the clock WCK provided from the host by one-quarter to generate four initial clocks WCK0', WCK90', WCK180', and WCK270' having different phases. If the CA signals decoded by the command decoder 1230 is a CSP command, the command decoder 1230 may provide a CSP feedback to the frequency dividing circuit 1210. The multiplexer 1212 may multiplex the CSP feedback and the initial clocks WCK0', WCK90', WCK180', and WCK270' generated by the frequency divider 1211 to generate the clocks WCK0, WCK90, WCK180, and WCK270. The multiplexer 1212 may adjust the timing of the initial clocks WCK0', WCK90', WCK180', and WCK270' based on the CSP feedback to generate the clocks WCK0, WCK90, WCK180, and WCK270.

Figure 13:
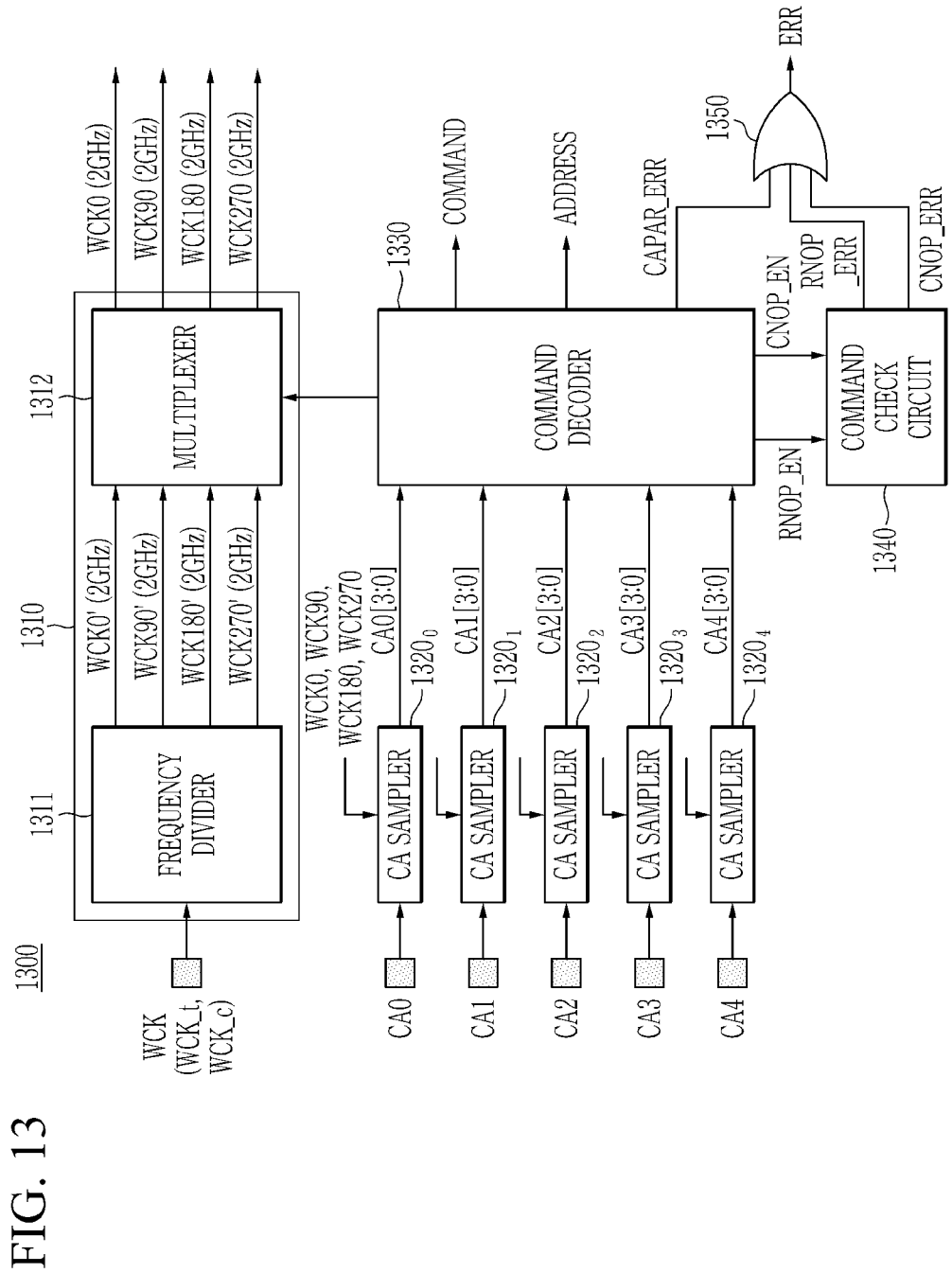

FIG. 13 is a block diagram illustrating an example of a memory device according to some embodiments.

In FIG. 13, a CA control circuit 1300 may include a frequency dividing circuit 1310, a plurality of CA samplers $1320_0$, $1320_1$, $1320_2$, $1320_3$, and $1320_4$, a command decoder 1330, and a command check circuit 1340. In some embodiments, the frequency dividing circuit 1310 may include a frequency divider 1311 and a multiplexer 1312.

The frequency dividing circuit 1310, the plurality of CA samplers $1320_0$, $1320_1$, $1320_2$, $1320_3$, and $1320_4$, and the command decoder 1330 may perform similar operations to the frequency dividing circuit 1210, the plurality of CA samplers $1220_0$, $1220_1$, $1220_2$, $1220_3$, and $1220_4$, and the command decoder 1230 described with reference to FIG. 12, and therefore detailed descriptions thereof are omitted.

The command decoder 1330 may output an RNOP enable signal RNOP_EN when recognizing signals CA0[3:0], CA1[3:0], and CA2[3:0] corresponding to a row command/address among the decoded CA signals as an RNOP command. In addition, the command decoder 1330 may output a CNOP enable signal CNOP_EN when recognizing the signals CA3[3:0] and CA4[3:0] corresponding to a column command/address among the decoded CA signals as a CNOP command.

Upon receiving the RNOP enable signal RNOP_EN, the command check circuit 1340 may compare the signals CA0[3:0], CA1[3:0], and CA2[3:0] corresponding to the row command/address with an RNOP3 command, and may output an error signal RNOP_ERR indicating a result of the comparison, i.e., whether the signals CA0[3:0], CA1[3:0], and CA2[3:0] are identical to RNOP3 command. Upon receiving the CNOP enable signal CNOP_EN, the command check circuit 1340 may compare the signals CA3[3:0] and CA4[3:0] corresponding to the column command/address with a CNOP3 command, and may output an error signal CNOP_ERR indicating a result of the comparison, i.e., whether the signals CA3[3:0] and CA4[3:0] are identical to CNOP3 command.

In some embodiments, the CA control circuit 1300 may further include a logic circuit 1350. The logic circuit 1350 may output a final error signal ERR by combining the error signal CAPAR_ERR output by the command decoder 1330 and the error signals RNOP_ERR and CNOP_ERR output by the command check circuit 1340. In some embodiments, the logic circuit 1350 may be an OR circuit that performs an OR operation on the error signals CAPAR_ERR, RNOP_ERR, and CNOP_ERR.

In some embodiments, each of the components, elements, modules, or units represented by a block as illustrated in FIG. 1 to FIG. 13 may be implemented as various numbers of hardware, software, and/or firmware structures that execute respective functions described above, according to embodiments. For example, at least one of these components, elements, modules, or units may include various hardware components including a digital circuit, a programmable or non-programmable logic device or array, an application specific integrated circuit (ASIC), or other circuitry using a digital circuit structure, such as a memory, a processor, a logic circuit, a look-up table, etc., that may execute the respective functions through controls of one or more microprocessors or other control apparatuses. Further, at least one of these components, elements, modules, or units may include a module, a program, or a part of code, which contains one or more executable instructions for performing specified logic functions, and executed by one or more microprocessors or other control apparatuses. Furthermore, at least one of these components, elements, modules, or units may further include or may be implemented by a processor such as a central processing unit (CPU) that performs the respective functions, a microprocessor, or the like. Functional aspects of embodiments may be implemented in algorithms that execute on one or more processors.

While this disclosure has been described in connection with what is presently considered to be practical embodiments, it is to be understood that the disclosure is not limited to the disclosed embodiments. On the contrary, it is intended to cover various modifications and equivalent arrangements included within the spirit and scope of the appended claims.

What is claimed is:

1. A memory device comprising:
a plurality of command and address (CA) samplers configured to receive, as a plurality of first CA signals, a command comprising a predetermined pattern via a CA bus based on an exit of a sleep mode, wherein each of the plurality of CA samplers is further configured to sample a corresponding first CA signal among the plurality of first CA signals; and
a command decoder configured to check a parity error in the plurality of first CA signals sampled by the plurality of CA samplers,
wherein the plurality of CA samplers are further configured to:
receive a first row-no-operation (RNOP) command and a first column-no-operation (CNOP) command as a plurality of second CA signals before receiving the command comprising the predetermined pattern; and
receive a second RNOP command and a second CNOP command as a plurality of third CA signals after receiving the command comprising the predetermined pattern.

2. The memory device of claim 1, wherein the first RNOP command corresponds to one or more second CA signals among the plurality of second CA signals,
wherein the first RNOP command comprises high levels over a plurality of first consecutive clock cycles,
wherein the first CNOP command corresponds to one or more other second CA signals among the plurality of second CA signals,
wherein the first CNOP command comprises the high levels over the plurality of first consecutive clock cycles,
wherein the second RNOP command corresponds to one or more third CA signals among the plurality of third CA signals,
wherein the second RNOP command comprises the high levels over a plurality of second consecutive clock cycles,
wherein the second CNOP command corresponds to one or more other third CA signals among the plurality of third CA signals, and
wherein the second CNOP command comprises the high levels over the plurality of second consecutive clock cycles.

3. The memory device of claim 2, wherein the predetermined pattern comprises a pattern in which one or more first CA signals among the plurality of first CA signals has a low level at a beginning clock cycle of the command having the predetermined pattern.

4. The memory device of claim 2, wherein the predetermined pattern comprises a pattern in which one or more first CA signals among the plurality of first CA signals have a low level at a last clock cycle of the command having the predetermined pattern.

5. The memory device of claim 1, wherein the predetermined pattern comprises a pattern for testing the CA bus.

6. The memory device of claim 1, wherein the predetermined pattern comprises a pattern in which one or more first CA signals among the plurality of first CA signals toggle from a high level to a low level or from the low level to the high level.

7. The memory device of claim 1, wherein the predetermined pattern comprises a pattern in which one or more first CA signals among the plurality of first CA signals have high levels over a plurality of consecutive clock cycles, and subsequently, change to low levels.

8. The memory device of claim 1, wherein the predetermined pattern comprises a pattern in which one or more first CA signals among the plurality of first CA signals have low levels over a plurality of consecutive clock cycles, and subsequently, change to high levels.

9. The memory device of claim 1, wherein the command decoder is further configured to enter a CA training mode based on the parity error occurring in the plurality of first CA signals.

10. A memory control device comprising:
a clock generating circuit configured to provide a clock to a memory device via a clock bus; and
a command and address (CA) generating circuit configured to provide, as a plurality of first CA signals, a command comprising a predetermined pattern to the memory device via a CA bus, based on an exist of a sleep mode of the memory device,
wherein the CA generating circuit is further configured to:
provide, as a plurality of second CA signals, a first row-no-operation (RNOP) command and a first column-no-operation (CNOP) command to the memory device before providing the command having the predetermined pattern; and
provide, as a plurality of third CA signals, a second RNOP command and a second CNOP command to the memory device after providing the command having the predetermined pattern.

11. The memory control device of claim 10, wherein the first RNOP command corresponds to one or more second CA signals among the plurality of second CA signals,
wherein the first RNOP command has high levels over a plurality of first consecutive clock cycles,
wherein the first CNOP command corresponds to one or more other second CA signals among the plurality of second CA signals,
wherein the first CNOP command comprises the high levels over the plurality of first consecutive clock cycles,
wherein the second RNOP command corresponds to one or more third CA signals among the plurality of third CA signals,
wherein the second RNOP command has the high levels over a plurality of second consecutive clock cycles,
wherein the second CNOP command corresponds to one or more other third CA signals among the plurality of third CA signals, and
wherein the second CNOP command comprises the high levels over the plurality of second consecutive clock cycles.

12. The memory control device of claim 11, wherein the predetermined pattern comprises a pattern in which one or more first CA signals among the plurality of first CA signals has a low level at a beginning clock cycle of the command having the predetermined pattern.

13. The memory control device of claim 11, wherein the predetermined pattern comprises a pattern in which one or more first CA signals among the plurality of first CA signals have a low level at a last clock cycle of the command having the predetermined pattern.

14. The memory control device of claim 10, wherein the predetermined pattern comprises a pattern for testing the CA bus.

15. The memory control device of claim 10, wherein the predetermined pattern comprises a pattern in which one or more first CA signals among the plurality of first CA signals toggle from a high level to a low level or from the low level to the high level.

16. The memory control device of claim 10, wherein the predetermined pattern comprises a pattern in which one or more first CA signals among the plurality of first CA signals have high levels over a plurality of consecutive clock cycles and then change to low levels.

17. The memory control device of claim 10, wherein the predetermined pattern comprises a pattern in which one or more first CA signals among the plurality of first CA signals have low levels over a plurality of consecutive clock cycles and then change to high levels.

18. A method of operating a memory device, comprising:
- exiting from a sleep mode of the memory device;
- receiving a first row-no-operation (RNOP) command and a first column-no-operation (CNOP) command via a command and address (CA) bus over a plurality of first clock cycles, wherein the first RNOP command and the first CNOP command comprise a predetermined type;
- receiving a command having a predetermined pattern via the CA bus over a plurality of second clock cycles after the plurality of first clock cycles; and
- receiving a second RNOP command and a second CNOP command having the predetermined type via the CA bus over a plurality of third clock cycles after the plurality of second clock cycles.

\* \* \* \* \*